Sept. 11, 1951     E. E. WILLIS ET AL     2,567,535
TELESCOPIC SIGHT MOUNT

Filed Aug. 28, 1947     2 Sheets-Sheet 1

INVENTORS.
EDWARD E. WILLIS &
BY MORLEY S. HEWINS
Attys.

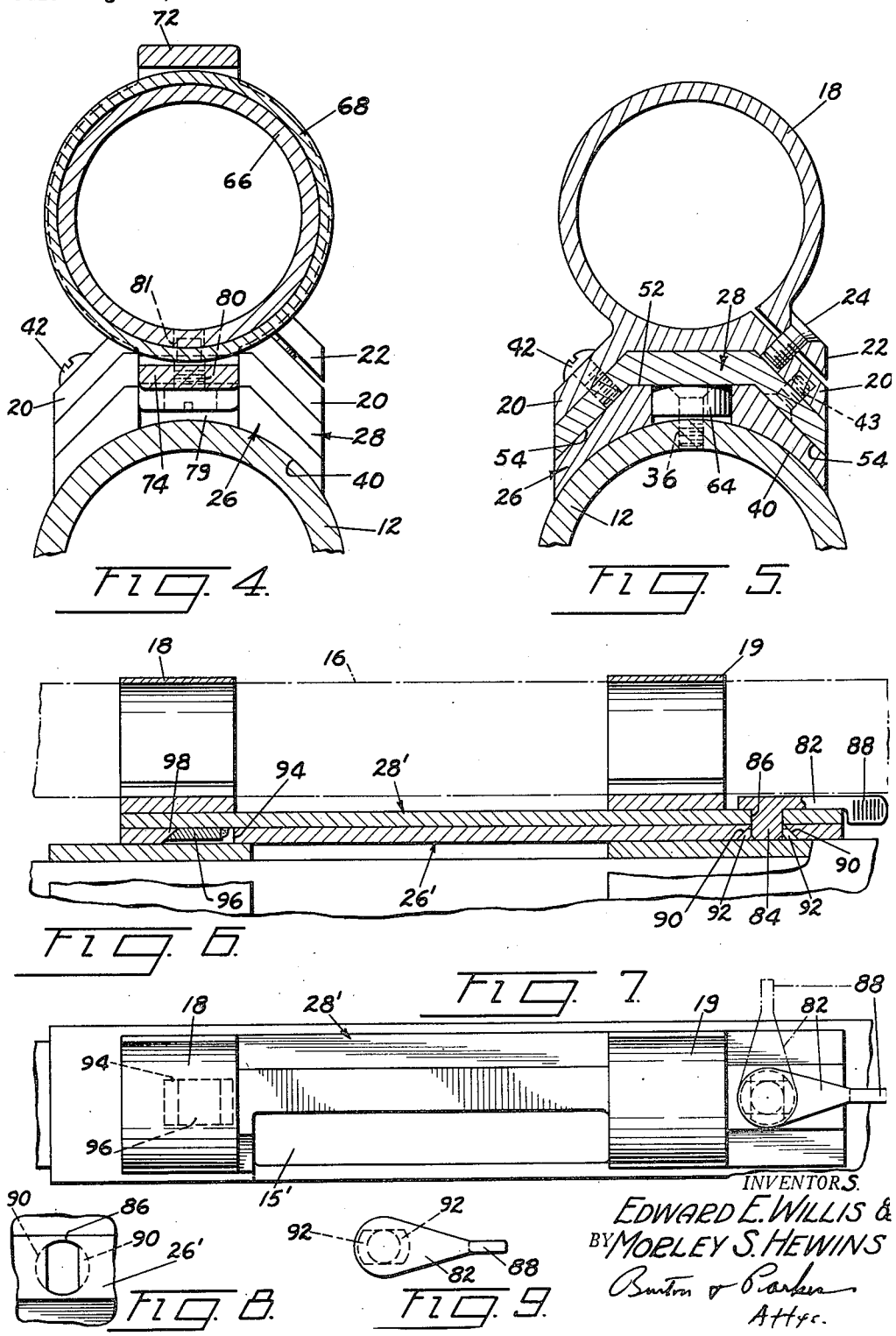

Patented Sept. 11, 1951

2,567,535

UNITED STATES PATENT OFFICE 2,567,535

TELESCOPIC SIGHT MOUNT

Edward E. Willis and Morley S. Hewins,
Hazel Park, Mich.

Application August 28, 1947, Serial No. 771,056

8 Claims. (Cl. 33—50)

1

This invention relates to telescopic sight mounts for rifles and particularly to improvements in detachable telescopic mounts of that character.

An important object of this invention is to provide a telescope mounting for rifles which enables the telescope to be quickly and easily attached and removed and when mounted firmly and rigidly holds the telescope in accurate alignment with the barrel of the rifle. Another important object of the invention is to provide an improved mount for telescopic sights which is composed of parts easily and inexpensive to manufacture and assemble, yet firmly and solidly retains the telescope in position on the rifle against any movement resulting from the thrust induced by recoil or accidental mishandling of the gun. A further important object of the invention is to provide a telescopic mount of this character which requires the simple adjustment of a single control member for firmly securing the mount in position on the rifle or for detaching the same therefrom.

An important object and feature of the invention is the provision made for insuring that the telescope, when removed and replaced, will return to its original position without the necessity of any adjustment. Another important feature of the invention is to provide a telescopic mount including two plate members, one normally remaining on the gun and the other normally attached to the telescope, which are shaped for novel cooperating engagement for accurately aligning the telescope with the barrel and which function in a positive manner to maintain the telescope in aligned position so long as it is mounted thereon. A further important feature of the invention is the provision of a single readily accessible control member which not only positively locks the telescope on the rifle against separating movement but also tightly wedges the same into accurately aligned position on the rifle.

Various other objects, advantages and meritorious features will become more fully apparent from the following specification, appended claims and accompanying drawings wherein:

Fig. 1 is a fragmentary side elevation of a rifle provided with the telescope mount of the present invention, Fig. 2 is a vertical longitudinal sectional view through the mount of Fig. 1 illustrating the manner of assembling the same upon a rifle, Fig. 3 is an exploded perspective view illustrating the parts of the telescopic mount in the order of their assembly,

2

Fig. 4 is an enlarged vertical sectional view taken along line 4—4 of Fig. 1,

Fig. 5 is an enlarged vertical sectional view taken along line 5—5 of Fig. 1,

Fig. 6 is a vertical longitudinal sectional view similar to Fig. 2 but illustrating a modification of the invention, Fig. 7 is a top plan view of the telescopic mount of Fig. 6, Fig. 8 is a detailed view of one portion of the base plate of the mount, and, Fig. 9 is a detailed view of the locking lever employed in the modification illustrated in Figs. 6 and 7.

Figure 1:
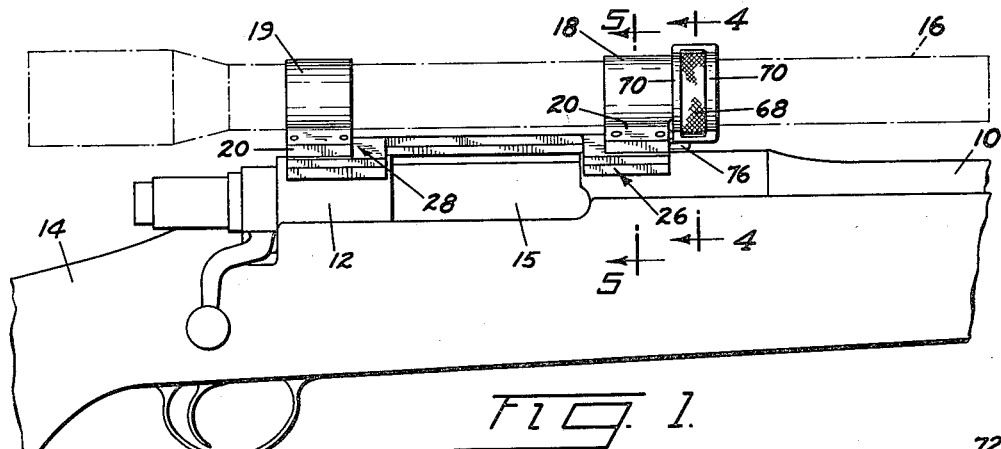

The telescopic mount of the present invention is adapted to various types of rifles and is herein applied to a standard U. S. Army rifle commonly referred to as the 1917 Enfield rifle. Referring to the drawings, there is shown a rifle of this character having a barrel 10, a receiver 12, and a stock 14. The sliding bolt of such a rifle is indicated at 15. Mounted on the rifle is a telescopic sight tube of conventional construction shown in dotted outline and referred to by reference numeral 16.

Figure 3:
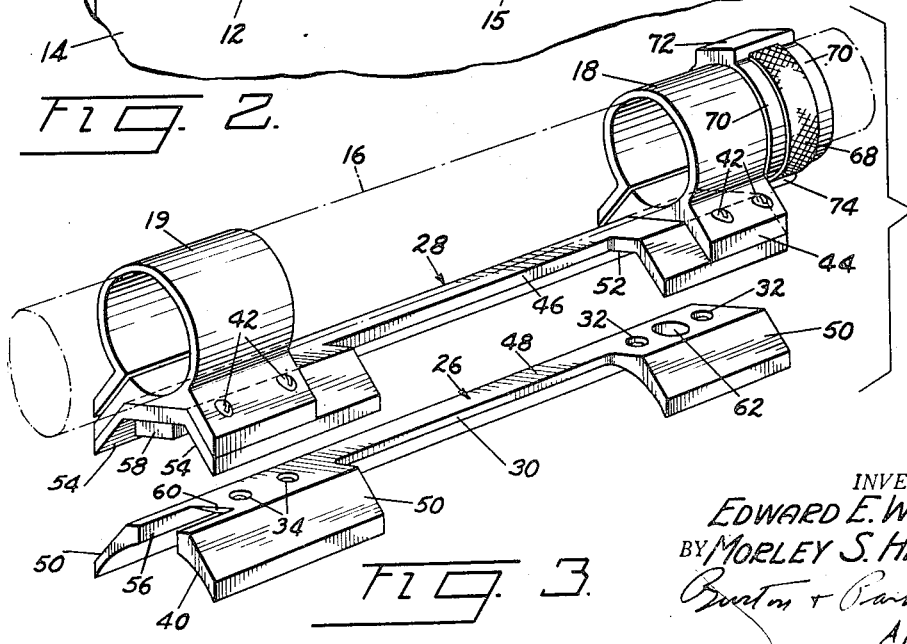

The present invention relates to the means for detachably securing the sight tube 16 to the gun. For this purpose, the telescope tube 16 is received in two mounting elements 18 and 19 each of which comprise a split circular sleeve or strap as shown in Figs. 3 and 5. One such sleeve or strap 18 is located adjacent to the forward end of the telescope tube and the other sleeve or strap 19 is located adjacent to the rear portion of the tube. Each circular strap is provided with two outwardly and downwardly inclined base flanges 20—20 on opposite sides thereof. At the split in the sleeve there is provided a flange 22 having one or more screws 24 which project through countersunk openings therein and are threaded in suitable tapped openings in the adjacent base flange 20 of the strap. It will be apparent that when the screws 24 are tightened, the attaching elements 18 and 19 will be wrapped tightly about and solidly grip the telescopic tube 16.

Figure 2:
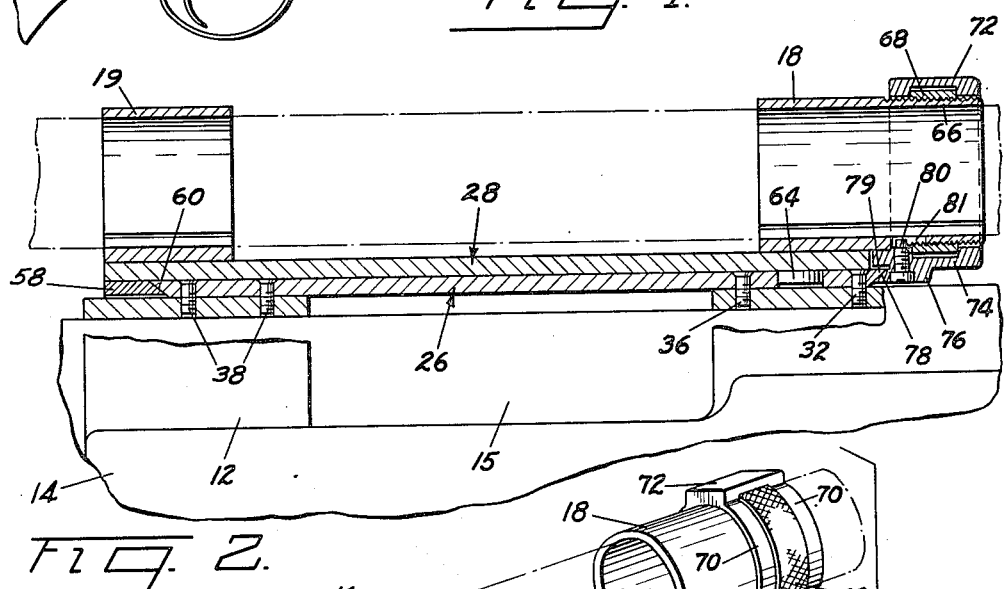

The mount comprises two elongated members generally indicated at 26 and 28 and referred to respectively as the lower base plate 26 and the upper detachable plate 28. The base plate is shaped for seating firmly and solidly upon the rear end of the barrel 10 on the upper surface of the receiver 12. The base plate is constructed to lay along the top of the barrel 10 in this region and is cut away as indicated at 30 in Fig. 3 in line with the cartridge receiving opening of the rifle in order that the cartridges may be easily fed thereinto in the conventional manner and for the ejection of the cartridge shells therefrom. The base plate 26 is of such a length that it extends beyond both ends of this cartridge receiving opening and is secured to the barrel forwardly and rearwardly of the opening. As shown in Figs. 2 and 3 the base plate 26 is provided with a pair of screw receiving apertures 32—32 at its forward end and a similar pair of screw receiving apertures 34—34 at its rear portion. Prior to the assembly of the base plate upon the rifle, the barrel is bored to provide tapped openings which will receive the screws inserted into these openings. Referring to Fig. 2, screw members 36—36 are provided at the forward end of the base plate for insertion in the openings 32 and for threaded engagement in the holes drilled and tapped in the top of the barrel. Similarly, screw members 38—38 are likewise provided for securing the rear portion of the base plate 26 to the barrel.

The upper surface of the receiver 12 of the rifle is generally cylindrically curved and therefore in order to accommodate the base plate 26 the under surface of the latter is correspondingly shaped to provide a curved recess as shown at 40 in Figs. 3, 4 and 5. Thus shaped the base plate will fit firmly and solidly upon the rear end of the barrel in the region of the receiver. The under surface of the base plate 26 may be varied in shape and formation for mounting on each different type of rifle and it is understood that the particular curved recess 40 illustrated herein may be altered to accommodate the base plate for other types of rifles. Once mounted upon the rifle the base plate 26 may be permanently retained thereon even when the telescopic tube is removed from the gun. It is to be noted that the base plate 26 when thus mounted will not interfere with the standard open sights of the gun.

The upper plate 28 of the mount carries the two telescope holding straps 18 and 19. Each strap is secured to the upper plate 28 by holding screws. Two such holding screws 42 on the side opposite the flange 22 have their heads disposed on the outside of the flange 20. Two such holding screws 43 on the side of the flanges 22 have their heads countersunk on the bottom side of the upper plate 28 as shown in Fig. 5. Thus secured, the straps and the upper plate member 28 are retained together and form a unit in which the telescope tube 16 is mounted. The upper plate 28 of the mount is cut away to provide a recess 46 which corresponds in shape and position to the recess 30 of the base plate 26. When the upper plate 28 is mounted upon the base plate 26 the two recesses are co-extensive with one another and form an opening for feeding cartridges into the receiver 12 and for the ejection of cartridge shells therefrom.

Both the base plate 26 and the upper plate 28 of the mount are shaped in a novel manner for firmly and solidly securing the two together in properly aligned position upon the rifle. As shown in Figs. 3, 4 and 5, the upper surface of the base plate is shaped to form a V-way including a top flat surface 48 and two downwardly inclined surfaces 50—50 on opposite sides of the top surface. Similarly the underside of the upper plate 28 is provided with a flat intermediate surface 52 and two downwardly inclined surfaces 54—54 on opposite sides thereof. In the making of the two plates they are machined to provide the surfaces 48, 50, 52 and 54 of such angular relation to one another that when the top plate is placed upon the base plate the surfaces on the underside of the upper plate are brought into facial contact with the surfaces of the V-way of the base plate throughout their extent. In this manner the top plate is rigidly held to the base plate against any lateral play relative thereto.

To secure the two plates 26 and 28 against any axial displacement, cooperating elements are provided thereon which tightly wedge the two plates together. Referring to Fig. 3, the base plate 26 is provided with a rearwardly opening recess 56 in the top surface of the back portion thereof which is adapted to receive a short depending extension or lug 58 secured by welding or otherwise to the underside of the upper plate 28. The inner end of the recess 56 is under-cut as shown at 60 and provided with a downwardly and forwardly inclined face. The forward end of the lug 58 of the upper plate is provided with an upwardly and rearwardly inclined face which as shown in Fig. 3 has the same angularity as the inclined face 60 of the lower plate and is adapted to engage the same. When mounting the telescope upon the rifle, the lug 58 is first inserted into the recess 56 of the lower plate and upon a slight forward movement of the upper plate the two inclined faces will be brought into abutting engagement.

The upper surface 48 at the forward end of the base plate is provided with a relatively large circular hole 62 located between the two screw openings 32—32. Receivable in this hole is a circular depending projection or boss 64 secured by welding or otherwise to the underside of the upper plate 28. The boss 64 of the upper plate cooperates with the rear lug 58 to initially position the upper plate upon the base plate.

The leading strap 18 of the mount is provided as shown best in Fig. 2 with a forwardly extending sleeve portion 66 which is externally threaded. Encircling this sleeve portion 66 and threadedly engaging the threads thereof is a rotatable circular member or ring 68 which may be knurled on its outer surface as shown in Fig. 3 to facilitate turning. The ring 68 has an axial dimension less than the sleeve portion 66 of the strap. Encircling the sleeve portion 66 is a collar composed of two axially spaced apart circular sections or bands 70—70 located immediately adjacent to the opposite sides of the ring 68. These bands are integrally joined together by a cross member 72 above the sleeve and a cross member 74 below the sleeve. The cross members 72 and 74 extend over the ring 68 with sufficient clearance to allow the ring to turn freely. The major portion of the periphery of the ring 68 is exposed through the collar for manual adjustment.

The bottom cross member 74 of the collar is provided with a downwardly depending projection 76 shaped at its rearward end with a downwardly inclined face 78. The forward end of the base plate 26 is undercut as shown in Fig. 2 to provide a lip 79 for receiving the inclined face 78, the angularity of such undercut being the same as the face 78 so that the two faces thereof may be brought into contact upon rearward shiftable movement of the collar. It is evident from Fig. 2 that upon rotation of the ring 68 it will travel along the threads of the sleeve portion 66 and by virtue of the engagement with either one of the bands 70—70 cause the collar to move in an axial direction.

When mounting the telescope upon the gun, the ring 68 is rotated in the direction to advance the collar forwardly relative to the sleeve portion 66 and the strap 18 sufficiently to clear the projection 76 and its inclined face 78 beyond the lip 79 at the forward end of the base plate 26. When the upper plate is properly mounted upon the base plate with the lugs 58 and 64 in their respective recesses of the base plate, the ring 68 is rotated in the opposite direction to cause the collar to travel rearwardly and wedge the projection 76 into the undercut forward lip 79 of the base plate as shown in Fig. 2. After the telescope has been properly mounted upon the base plate rotatable adjustment of the ring 68 will wedge the inclined face 78 of the projection 76 at the forward end and the inclined face of the lug 58 at the rearward end into tight engagement with the base plate.

To prevent complete withdrawal of the collar from the sleeve 66 there is provided a stop in the form of an upwardly extending screw member 80 (Fig. 2) in the bottom projection 76 of the sleeve which enters an axially elongated slot or opening 81 in the sleeve. The upper end of the screw 80 terminates at a height slightly above the level of the external threads on the sleeve 66 so that when the ring 68 is rotated in the direction to withdraw the collar from the sleeve 66 the screw will abut the forward end of the slot and prevent any further movement of the collar in that direction. The length of the slot 81 is sufficient to allow complete withdrawal of the inclined face 78 from under the lip 79.

Figs. 6 to 9 inclusive illustrate a modification of the invention. In these figures the telescope is shown with the forward end at the left. In place of the collar 70—70 and adjustable ring 68 heretofore described there is provided a locking lever which is adapted to enter a hole in the base plate 26' and secure the upper plate 28' thereto. The locking lever is indicated at 82 and is provided with a downwardly depending boss 84 which is rotatably received in a transversely elongated hole 86 formed in the rearward portion of the upper plate member as shown in Fig. 8. The sides of the lever 82 converge to provide a handle 88 which may be engaged by the fingers for swinging the boss 84 in the hole 86. The hole 86 is shaped with two undercut portions forming lips 90—90 on opposite long sides thereof. Secured to the depending boss 84 of the lever are two diametrically oppositely located wedging elements 92—92 which are shaped to slide under the lips 90—90 of the hole 86. When the lever 82 is in the dotted position shown in Fig. 7 the boss 84 with the wedging elements will freely enter the hole 86 when the upper plate is laid upon the lower plate. However, following this operation, the lever is turned 90° to the full line position indicated in Fig. 7 and the wedging elements 92—92 will slip in under the lips 90—90 and lock the two plates together. A single flip of the handle 88 will accomplish the locking action.

The forward end of the mount may be constructed as shown in the previously described modification or as shown in Figs. 6 and 7. In the latter construction, the base plate 26' is provided with a rectangular hole 94 into which a depending wedge 96 on the underside of the upper plate may drop. The forward edge of the hole 94 is undercut to provide the lip 98. The forward edge of the lug is provided with an inclined face that is engageable under the lip in the manner shown in Fig. 6 when the two plates are properly assembled together. When attaching the telescope in this modification the forward end of the upper plate is first engaged with the lower plate by introducing the wedge 96 into the hole 94 and engaging its rear face under the lip 98. Thereafter with the lever 82 turned to the dotted position in Fig. 7 the boss 84 with the wedging elements 92—92 may be inserted into the rear hole 86. Upon turning the lever to the full line position in Fig. 7, the wedging elements will lock the plates together.

It is apparent that there is provided a firm and accurate support for a telescope which enables the telescope to be quickly and easily detached and reassembled in position without disturbing the accuracy of the mounting. It is also evident that the V-ways formed on the upper surface of the base plate and the underside of the upper plate serve to hold the telescope firmly against any lateral shiftable movement. The wedging action of the adjustable collar of the first modification and the lever of the second modification assure a tight fit preventing any longitudinal shiftable movement of the telescope such as may occur as the result of the recoil shocks. The holding devices connecting the two plates together tightly hold the telescope against any rocking motion or displacement in any direction. No tools are required to mount the telescope on a rifle or remove the same therefrom and no strains are imposed on the telescope in either operation.

The large V-ways formed integrally on the two plate members 26 and 28 not only provide extreme accuracy but also give added strength to the mount. There is nothing to wear out as a result of constant usage for the reason that the accuracy is derived from the V-ways and not from the locking wedges or cams. Due to the angularity of the flat engaging faces 50—50 and 54—54, the telescope sight can be taken off and replaced repeatedly and always hold its zero. By virtue of the fact that the top and bottom supporting bases 28 and 26 are each made in one piece throughout their lengths it is impossible for the heaviest recoil of high powered rifles to cause any binding in the locking wedges or cams, or at any other places. The large telescope clamping bands illustrated herein have the necessary strength to hold the heaviest telescopes rigidly. When the telescope is on the rifle, the mount is streamlined and there are no projecting parts to catch on brush or one's clothing. When the telescope including the upper plate member 28 is removed from the rifle, the remaining base plate 26 is low and will not interfere with the open sights of the rifle nor snag on brush or clothing.

What we claim is:

1. A mount for a telescopic sight for rifles including, in combination, an elongated base plate attachable directly to the upper portion of a rifle, an elongated upper plate corresponding substantially in length to the base plate, the upper surface portion of the base plate and the under surface portion of the upper plate being shaped to provide complementary longitudinally extending V-ways adapted to be brought into surface contact and hold the two plates against any lateral movement relative to one another, a telescope clamping ring carried by the upper plate and projecting upwardly therefrom, a movable wedging element carried by the upper plate and movable in one direction to engage an inclined face on the base plate, an annularly shaped control member encircling the clamping ring, means threadedly coupling said control member to said clamping ring for threaded axial advancement, and means operatively connecting the control member to said movable wedging element and adapted upon rotation in one direction to move said wedging element into engagement with said inclined face.

2. A mount for a telescopic sight for rifles comprising, in combination, an elongated base plate attachable directly to the upper part of a receiver of a rifle and provided intermediate its ends with a side opening recess adapted to expose the cartridge receiving opening of the receiver, an elongated upper plate substantially co-extensive in length with that of the base plate and similarly provided intermediate its ends with a side opening recess adapted to expose the cartridge receiving opening of the receiver, the upper surface portion of the base plate and the under side portion of the upper plate being shaped throughout their longitudinal extent with cooperating V-ways adapted to be brought into facial contact to hold the plates rigidly together against lateral movement, a pair of telescope clamping rings secured to the upper plate adjacent to the opposite ends thereof and projecting upwardly therefrom in coaxial relation to one another, a stationary wedging element depending from the upper plate adjacent to one end thereof and adapted to engage a stationary inclined face on the base plate to limit the longitudinal movement of the upper plate in one direction, a movable wedging element depending from the upper plate adjacent to the opposite end thereof operable to engage a stationary inclined face on the base plate and cooperate with said stationary wedging element to hold the upper plate against longitudinal movement in either direction, an annularly shaped control member concentrically encircling the clamping ring adjacent to the end of the upper plate from which said movable wedging element depends and rotatably threadedly engaging the clamping ring for threaded axial movement relative thereto, and means operatively connecting said control member to said movable wedging element and adapted upon rotation of the former in one direction to advance the movable wedging element into engagement with the inclined face of the base plate with which it is associated.

3. A mount for a telescopic sight for rifles comprising, in combination, an elongated base plate detachable directly to the upper part of a receiver of a rifle and provided intermediate its ends with a side opening recess adapted to expose the cartridge receiving opening of the receiver, an elongated upper plate substantially co-extensive in length with that of the base plate and similarly provided intermediate its ends with a side opening recess adapted to expose the cartridge receiving opening of the receiver, a pair of upstanding telescope clamping rings carried by the upper plate adjacent to the opposite ends thereof and arranged co-axially to one another, a stationary wedging element depending from the underside of the upper plate adjacent to one end thereof adapted to engage a stationary undercut inclined face on the base plate to limit the longitudinal movement of the upper plate in one direction, a movable wedging element depending from the underside of the upper plate adjacent to the opposite end thereof adapted to move into engagement with a stationary undercut inclined face on the base plate and when so engaged to co-operating with the stationary wedging element to hold the upper plate against longitudinal movement in either direction, an annularly shaped manual control member encirclingly mounted on the clamping ring adjacent to the end of the upper plate from which said movable wedging element depends and rotatably threadedly engaging the clamping ring for threaded axial movement relative thereto, said member adapted to encircle a telescope carried by said clamping rings, and means operatively connecting said control member to said movable wedging element and adapted upon rotation in one direction to advance the movable wedging element into engagement with the inclined face of the base plate with which it is associated.

4. A mount for telescopic rifles including, in combination, a base plate attachable directly to the upper part of a rifle, an upper plate removably supported on the base plate and having a clamping band for receiving and clamping a telescope thereto, an axially slidable collar mounted on said band having a depending wedging element movable therewith and adapted in one direction of its movement to engage an undercut inclined face on the base plate, a ring shaped control member co-axially rotatably mounted on the clamping band and threaded thereto for axial movement therealong, and means coupling said collar to said control member for joint axial movement therewith in either direction but permitting independent rotation of the control member relative to the collar, said coupling means adapted upon threaded adjustment of said control member to slidably shift the collar axially along the clamping band and when rotated in one direction to cause the wedging element of the collar to move into engagement with the inclined face of the base plate.

5. In a mount for telescopic sights for rifles, a removable plate member, an upright band secured to the plate member and being shaped to encircle a telescope to hold the same to the plate member, said band having an externally threaded sleeve portion, an internally threaded ring encircling said sleeve portion and threadedly engaging the same, a collar axially movably mounted on said sleeve portion and shaped to be engaged by the ring when the latter is threadedly advanced on the sleeve portion, and a depending lip on the collar having an inclined wedging face adapted to move with the collar when the latter is caused to be axially moved by the threaded advancement of the ring.

6. In a telescope mount, a supporting plate having an upright telescope holding clamping band, means for releasably locking the plate upon a rifle, and a ring-shaped control member encircling the clamping band and rotatable therearound for actuating the locking means.

7. In a telescope mount for a rifle, an elongated telescope supporting plate member attachable to a rifle, a fixed longitudinally inclined wedging element depending from one end section of the plate member, an oppositely longitudinally inclined wedging element depending from the opposite end section of the plate member and mounted for movement toward and away from the fixed wedging element, said movable wedging element adapted when moved in one direction to cooperate with said fixed wedging element to lock the plate member to the rifle, a telescope encircling clamping band supported in upright position on the plate member, a control member carried by the clamping band and rotatable about the axis of the band, and means coupling the control member with the movable wedging element and operable upon rotation of the control member to move the element in said locking direction.

8. A mount for a telescopic sight for rifles comprising, in combination, an elongated base plate attachable directly to the upper band of a rifle and provided at its opposite ends with oppositely inclined wedge engaging faces, an elongated upper plate removably seated on the base plate, a pair of telescope clamping bands secured to the upper plate adjacent to its opposite ends and projecting upwardly therefrom in co-axial relation to one another, one of said clamping bands having an externally threaded section, a depending stationary wedging element carried by the upper plate adjacent to the end thereof opposite to the threaded clamping band and engageable with the inclined face on the adjacent end of the base plate, a rotatable internally threaded ring-shaped member encircling the threaded clamping band and engaging the threaded section thereof, a collar encircling the threaded clamping band in straddling relation to said ring-shaped member and mounted on the band for axial travel therealong, a depending wedging element carried by the collar and engageable with the inclined face on the adjacent end of the base plate, said ring-shaped member adapted upon rotative threaded adjustment to engage the collar and shift the collar axially along the threaded clamping ring, said depending wedging elements adapted to engage their respective inclined faces of the base plate and cooperate together to hold the upper plate on the base plate against longitudinal shiftable movement.

EDWARD E. WILLIS.
MORLEY S. HEWINS.

REFERENCES CITED

The following references are of record in the file of this patent:

UNITED STATES PATENTS

| Number | Name | Date |
|---|---|---|
| 2,073,210 | Hosrud | Mar. 9, 1937 |
| 2,187,054 | Redfield | Jan. 16, 1940 |
| 2,224,783 | Gibbs | Dec. 10, 1940 |
| 2,368,954 | Weaver | Feb. 6, 1945 |
| 2,396,404 | Williams et al. | Mar. 12, 1946 |
| 2,401,825 | Gruver | June 11, 1946 |
| 2,407,977 | English | Sept. 24, 1946 |
| 2,427,784 | Herkner | Sept. 23, 1947 |
| 2,475,383 | Foster | July 5, 1949 |

FOREIGN PATENTS

| Number | Country | Date |
|---|---|---|
| 328,267 | Germany | of 1920 |
| 266,848 | Great Britain | of 1927 |